(12) United States Patent
Yamaya et al.

(10) Patent No.: US 6,696,515 B2
(45) Date of Patent: Feb. 24, 2004

(54) HARD PROTECTIVE COAT-FORMING COATING COMPOSITIONS AND OPTICAL ARTICLES

(75) Inventors: Masaaki Yamaya, Gunma-ken (JP); Masahiro Furuya, Gunma-ken (JP); Koichi Higuchi, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/334,911

(22) Filed: Jan. 2, 2003

(65) Prior Publication Data

US 2003/0134951 A1 Jul. 17, 2003

(30) Foreign Application Priority Data

Jan. 15, 2002 (JP) ........................................ 2002-006021

(51) Int. Cl.[7] .............................................. C09G 77/12
(52) U.S. Cl. .................... 524/506; 524/586; 524/588; 351/163; 351/164; 351/165; 351/166
(58) Field of Search .................. 524/506, 586, 524/588; 351/163, 164, 165, 166

(56) References Cited

U.S. PATENT DOCUMENTS

| | | | |
|---|---|---|---|
| 5,679,820 A | | 10/1997 | Pickett et al. |
| 6,027,816 A | * | 2/2000 | Ono et al. ................... 428/447 |
| 6,368,521 B1 | * | 4/2002 | Sasaki et al. ................ 252/589 |
| 6,547,390 B1 | * | 4/2003 | Bernheim et al. .......... 351/163 |

FOREIGN PATENT DOCUMENTS

| | | | | |
|---|---|---|---|---|
| EP | 1 036 834 A1 | | 9/2000 | |
| EP | 1 122 278 A2 | | 8/2001 | |
| JP | 06299132 A | * | 10/1994 | ............ C09J/33/14 |
| JP | 11-58654 A | | 3/1999 | |
| JP | 3145298 B2 | | 1/2001 | |
| JP | 2001-79980 A | | 3/2001 | |
| JP | 2001-220543 A | | 8/2001 | |

* cited by examiner

Primary Examiner—David W. Wu
Assistant Examiner—Satya Sastri
(74) Attorney, Agent, or Firm—Birch, Stewart, Kolasch & Birch, LLP

(57) ABSTRACT

A coating composition comprising (1) a partial condensate obtained by subjecting a silane compound of $R_mSiX_{4-m}$ to hydrolysis and partial condensation with a sufficient amount of water to meet a molar ratio: $1.2 \leq H_2O/Si-X \leq 10$, (2) a vinyl polymer having UV absorbing groups and hydrophilic groups which is dissolvable or dispersible in a water-containing hydrophilic solvent, and (3) a hydrophilic organic solvent can form a hard protective coat having improved weather resistance.

20 Claims, No Drawings

US 6,696,515 B2

HARD PROTECTIVE COAT-FORMING COATING COMPOSITIONS AND OPTICAL ARTICLES

This nonprovisional application claims priority under 35 U.S.C. §119(a) on Patent Application No. 2002-006021 filed in JAPAN on Jan. 15, 2002, which is herein incorporated by reference.

TECHNICAL FIELD

This invention relates to coating compositions for forming hard protective coats having weather resistance and optical articles having protective coats of the compositions.

BACKGROUND OF THE INVENTION

Transparent plastic articles have been used as the glass substitute owing to their advantages of light weight and ease of working. However, their surface is vulnerable, which prevents plastic articles from being directly used in the optical application. One approach for improving the surface to a glass equivalent level is surface treatment with various hard coating compositions. The coating compositions which are used in practice are generally divided into two systems, acrylic UV-curable system and silicone system. The acrylic UV-curable system capable of brief curing is advantageously used in the field where productivity is of importance, but not suitable in the field where long-term weather resistance is required, because the acrylic resin serving as the skeleton is less resistant to weathering. On the other hand, the silicone system is slow in cure and less productive, but siloxane bonds becoming the major skeleton after curing are strong. Particularly when substituent groups are methyl, the system exhibits no absorption in the UV region and good weather resistance. The silicone system is thus used in the field requiring a high degree of mar resistance and long-term weather resistance.

However, silicone base hard coating compositions have several problems. They cure by the mechanism that condensation proceeds through water- or alcohol-removing reaction in which Si—OH groups are involved (e.g., ≡Si—OH+HO—Si≡→≡Si—O—Si≡+H$_2$O). Since the process entails a weight loss, the coat undergoes shrinkage during heat curing. Upon subsequent restoration to room temperature, the coat tends to incur stresses at the bonding interface due to a difference in coefficient of expansion from the substrate or a bond-improving primer thereon, increasing the likelihood of cracking. Although the silicone base coats are resistant to weathering, they lose adhesion and crack with the progress of time because the light transmitted thereby can gradually degrade the underlying substrate or a bond-improving primer thereon. Many attempts have been made to avoid the above phenomenon.

For example, JP-A 2001-79980 describes that polyethylene glycol is added to a hydrolyzed sol solution of a tetraalkoxysilane and a trialkoxysilane. Blending of the linear polymer in the system is effective for alleviating the stress generated upon curing and suppressing cracking immediately after film formation, but the cured film is less resistant to water because the polyethylene glycol is highly water absorptive. Upon exposure to light, the polyethylene glycol degrades with time and even decomposes and vaporizes off, rendering the film susceptible to cracking as before. The effect is not satisfactory.

Japanese Patent No. 3,145,298 discloses a silicone base hard coating composition obtained by partially hydrolyzing a silane compound having 1 to 4 hydrolyzable groups in colloidal silica wherein an acrylic resin having both epoxy groups and hydrolyzable silyl groups on side chains is added for the purpose of imparting toughness to coatings thereof. In this system, generation of cracks is noticeably suppressed. The acrylic resin is incorporated in the cured system as a result of the hydrolyzable silyl groups crosslinking with the silicone resin and thus imparts insufficient flexibility. Because of the lack of UV absorbing groups, the coating fails to achieve sufficient protection from UV to the surface to be coated (bonding interface). The coating tends to lose adhesion with the progress of time and eventually peel off.

JP-A 2001-220543 describes that UV absorbing groups are introduced by way of copolymerization into the acrylic resin having hydrolyzable silyl groups in the system of Japanese Patent No. 3,145,298, and a polyorganosiloxane terminated with Si—OH groups and containing phenyl groups is blended. This patent is successful in improving the degradation upon prolonged exposure to light, but is still insufficient for crack prevention because the flexibility imparting component is fixed by curing and crosslinking.

JP-A 11-58654 proposes a system in which a UV absorber, 2,2',4,4'-tetrahydroxybenzophenone is added to a polyorganosiloxane solution containing colloidal silica. In this system, the UV absorber is not fixed within the coating and can volatilize off or be leached out due to strong hydrophilic nature. As a consequence, weather resistance is somewhat improved, but voids form within the coating with the progress of time, allowing for further shrinkage of the silicone coating. No improvement in crack prevention is made because no flexibility improver is added and cracks are likely to occur.

U.S. Pat. No. 5,679,820 discloses a system comprising a silicone hardcoat composition and an organic silicon compound having hydrolyzable silyl groups introduced into a benzophenone UV absorber of a specific structure. This system provides satisfactory light shielding property because the UV absorber is fixed. Since the coat has a reduced crosslinking density under the influence of the steric bulkiness of UV absorbing groups, the coat is made softened, failing to provide acceptable mar resistance. Crack resistance is not improved due to the lack of a flexibility imparting component.

There is a need to have a coating composition capable of forming a protective coat having high mar resistance on a substrate surface which coat is prevented from cracking with the progress of time and thus maintains its performance over a long period of time.

SUMMARY OF THE INVENTION

An object of the invention is to provide a coating composition for forming a hard protective coat having improved weather resistance, and an optical article having a protective coat of the composition.

It has been found that by blending a silicone resin with a vinyl polymer containing UV absorbing groups and hydrophilic groups, devoid of hydrolyzable silyl groups, and dissolvable or dispersible in water-containing organic solvents, there is obtained a coating composition capable of forming a hard protective coat which is flexible enough to prevent cracking and thus has improved weather resistance while maintaining a high level of mar resistance.

More particularly, for preventing initial cracks immediately after curing, it is effective to blend a linear vinyl polymer having flexibility in the system to thereby relieve the stress generated upon curing. If the vinyl polymer is fixed within the cured silicone resin, the polymer fails to exert sufficient flexibility. It is thus preferred that the polymer be devoid of hydrolyzable silyl groups so that no further crosslinking proceeds with time. However, since the vinyl polymer is not fixed within the silicone resin, the cured silicone coat becomes accordingly rather short of hardness. It is also preferred to introduce UV absorbing groups into the vinyl polymer for the purposes of protecting the polymer itself and a substrate to be coated. However, since the crosslinking density is reduced as a result of introduction of UV absorbing groups, the cured silicone coat becomes rather short of hardness.

To compensate for the shortage of hardness or mar resistance, the curable silicone resin in the silicone hard protective coat-forming coating composition must be completely cured. To this end, it is preferred that ends of the silicone resin be converted to Si—OH groups and that hydrolysis be conducted as completely as possible. To this end, hydrolysis must be conducted in the presence of excess water. As a consequence, the coating composition solution becomes a water-containing system. Then the vinyl polymer containing UV absorbing groups, but devoid of hydrolyzable silyl groups must be dissolved or uniformly dispersed in the water-containing coating composition. To this end, the polymer must contain hydrophilic groups. The present invention is predicated on these findings.

In one aspect, the invention provides a coating composition for forming a hard protective coat, comprising (1) 100 parts by weight of a partial condensate obtained by subjecting a silane compound of the formula: $R_m SiX_{4-m}$ wherein R is a substituted or unsubstituted monovalent hydrocarbon group of 1 to 10 carbon atoms, X is a hydrolyzable group of 1 to 6 carbon atoms, and m is 0, 1 or 2, and/or a partial hydrolytic condensate thereof, to hydrolysis and partial condensation with a sufficient amount of water to meet a molar ratio: $1.2 \leq H_2O/Si—X \leq 10$, (2) 0.1 to 50 parts by weight of a vinyl polymer having UV absorbing groups and hydrophilic groups which is dissolvable or dispersible in a water-containing hydrophilic solvent, and (3) 50 to 5,000 parts by weight of a hydrophilic organic solvent.

In another aspect, the invention provides an optical article obtained by applying and curing the coating composition to a transparent plastic substrate, optionally having a bond-improving or primer layer on its surface, to form thereon a hard protective coat having weather resistance.

DETAILED DESCRIPTION OF THE INVENTION

In the coating composition for forming a hard protective coat according to the invention, component (1) is a partial condensate obtained by subjecting a silane compound of the formula (A):

$$R_m SiX_{4-m} \tag{A}$$

and/or a partial hydrolytic condensate thereof, to hydrolysis and partial condensation with a sufficient amount of water to meet a molar ratio:

$$1.2 \leq H_2O/Si—X \leq 10.$$

In formula (A), R is a substituted or unsubstituted monovalent hydrocarbon group of 1 to 10 carbon atoms, X is a hydrolyzable group of 1 to 6 carbon atoms, and m is 0, 1 or 2.

Referring to formula (A), examples of the substituted or unsubstituted monovalent hydrocarbon group of 1 to 10 carbon atoms represented by R include straight, branched or cyclic alkyl groups such as methyl, ethyl, propyl, butyl, hexyl, decyl, cyclohexyl and 1,1,2-trimethylpropyl, aryl groups such as phenyl and tolyl, aralkyl groups such as benzyl and phenylethyl, alkenyl groups such as vinyl, allyl, propenyl and butenyl, and substituted ones of the foregoing in which some or all of the hydrogen atoms are substituted with functional groups such as epoxy groups, amino groups, mercapto groups, (meth)acryloxy groups, halogen atoms (e.g., chloro), and cyano groups. Illustrative of the substituted groups are γ-chloropropyl, γ-glycidoxypropyl, β-3,4-epoxycyclohexyl, γ-aminopropyl, γ-mercaptopropyl, N-(β-aminoethyl)-γ-aminopropyl, γ-(meth)acryloxypropyl, β-cyanoethyl, trifluoropropyl, and perfluoroalkyl. Of these, methyl is most preferred because a coat having a high hardness, no light absorption in the UV region, and weather resistance are available.

X is a hydrolyzable group of 1 to 6 carbon atoms, examples of which include alkoxy, aryloxy, alkenyloxy and alkoxyalkoxy groups such as methoxy, ethoxy, propoxy, butoxy, phenoxy, isopropenoxy and methoxyethoxy, as well as acyloxy groups such as acetoxy, and oxime groups such as butanoxime. Of these, alkoxy groups are preferred, and methoxy and ethoxy are most preferred for ease of handling and stability.

The letter m is 0, 1 or 2, preferably 0 or 1.

Illustrative examples of the silane compound of formula (A) include trialkoxysilanes and triacyloxysilanes, such as methyltrimethoxysilane, methyltriethoxysilane, methyltris(2-methoxyethoxy)silane, methyltriacetoxysilane, methyltripropoxysilane, methyltriisopropenoxysilane, methyltributoxysilane, ethyltrimethoxysilane, ethyltriethoxysilane, propyltrimethoxysilane, propyltriethoxysilane, butyltrimethoxysilane, butyltriethoxysilane, decyltrimethoxysilane, vinyltrimethoxysilane, vinyltriethoxysilane, vinyltriacetoxysilane, vinyltris(2-methoxyethoxy)silane, vinyltriisopropenoxysilane, phenyltrimethoxysilane, phenyltriethoxysilane, phenyltriacetoxysilane, γ-chloropropyltrimethoxysilane, γ-chloropropyltriethoxysilane, γ-chloropropyltripropoxysilane, γ-glycidoxypropyltrimethoxysilane, γ-glycidoxypropyltriethoxysilane, β-(3,4-epoxycyclohexyl)ethyltrimethoxysilane, β-(3,4-epoxycyclohexyl)ethyltriethoxysilane, γ-aminopropyltrimethoxysilane, γ-aminopropyltriethoxysilane, γ-mercaptopropyltrimethoxysilane, γ-mercaptopropyltriethoxysilane, N-(β-aminoethyl)-γ-aminopropyltriimethoxysilane, γ-methacryloxypropyltrimethoxysilane, γ-acryloxypropyltrimethoxysilane, γ-methacryloxypropyltriethoxysilane, γ-acryloxypropyltriethoxysilane, methacryloxymethyltrimethoxysilane, acryloxymethyltrimethoxysilane, methacryloxymethyltriethoxysilane, trifluoropropyltrimethoxysilane, trifluoropropyltriethoxysilane, perfluorooctylethyltrimethoxysilane, perfluorooctylethyltriethoxysilane, γ-(perfluoropolyoxyethylene) substituted propyltrimethoxysilane, and β-cyanoethyltrimethoxysilane;

dialkoxysilanes and diacyloxysilanes such as dimethyldimethoxysilane, dimethyldiethoxysilane, dimethyldi(2-methoxyethoxy)silane, dimethyldiacetoxysilane, dimethyldipropoxysilane, dimethyldiisopropenoxysilane, dimethyldibutoxysilane, vinylmethyldimethoxysilane, vinylmethyldiethoxysilane, vinylmethyldiacetoxysilane, vinylmethyldi(2-methoxyethoxy)silane, vinylmethyldiisopropenoxysilane, phenylmethyldimethoxysilane, phenylmethyldiethoxysilane, phenylmethyldiacetoxysilane, γ-glycidoxypropylmethyldimethoxysilane, γ-glycidoxypropylmethyldiethoxysilane, γ-glycidoxypropylmethyldipropoxysilane, β-(3,4-epoxycyclohexyl)ethylmethyldimethoxysilane, β-(3,4-epoxycyclohexyl)ethylmethyldiethoxysilane, γ-aminopropylmethyldimethoxysilane, γ-aminopropylmethyldiethoxysilane, γ-mercaptopropylmethyldimethoxysilane, γ-mercaptopropylmethyldiethoxysilane, N-(β-aminoethyl)-γ-aminopropylmethyldimethoxysilane, γ-methacryloxypropylmethyldimethoxysilane, γ-acryloxypropylmethyldimethoxysilane, acryloxymethylmethyldimethoxysilane, β-cyanoethylmethyldimethoxysilane, trifluoropropylmethyldimethoxysilane, perfluorooctylethylmethyldimethoxysilane, perfluorooctylethylmethyldiethoxysilane, and γ-(perfluoropolyoxyethylene) substituted propylmethyldimethoxysilane; and tetraalkoxysilanes such as methyl silicate, ethyl silicate, n-propyl silicate, n-butyl silicate, sec-butyl silicate and t-butyl silicate.

The foregoing silane compounds may be used in the form of partial hydrolytic condensates of single silane compounds or mixtures thereof.

Also the foregoing silane compounds may be used in combination with other silane compounds, for example, disilane compounds such as $(CH_3O)_3Si—C_2H_4—Si(OCH_3)_3$, $(C_2H_5O)_3Si—C_2H_4—Si(OC_2H_5)_3$, $(CH_3O)_2CH_3Si—C_2H_4—SiCH_3(OCH_3)_2$, $(CH_3O)_3Si—C_6H_{12}—Si(OCH_3)_3$, $(CH_3O)_3Si—C_6H_4—Si(OCH_3)_3$, $(CH_3O)_3Si—C_2H_4—C_6H_4—C_2H_4—Si(OCH_3)_3$, etc. Use of silane compounds having 3 or 4 hydrolyzable groups is preferred for enhancing hardness whereas use of silane compounds having 2 hydrolyzable groups is preferred for imparting flexibility.

In the practice of the invention, the aforementioned silane compounds are used after they are subjected to hydrolysis and partial condensation with a sufficient amount of water to meet a molar ratio: $1.2 \leq H_2O/Si—X \leq 10$, that is, used in the form of partial condensates. This is because a silicone base hard protective coat-forming coating composition must be completely cured to compensate for shortage of hardness or mar resistance, which recommends that ends of silicone resin have been converted to Si—OH groups, which in turn, requires that hydrolysis have been conducted as completely as possible. Therefore, hydrolysis must be conducted in an excess water system. If hydrolysis is conducted in a molar ratio ($H_2O/Si—X$) of less than 1.2, hydrolysis does not take place to a full extent due to equilibrium between ≡Si—OR+$H_2O$ and Si—OH+ROH, resulting in an under-cured state. A molar ratio of more than 10 results in a coating suffering poor leveling and slow drying.

The water used for hydrolysis may be water alone or water containing an acid (such as formic acid, acetic acid, hydrochloric acid, nitric acid, maleic acid or solid acidic catalysts) or an organometallic compound (such as triisopropoxyaluminum, aluminum trisacetoacetonate, tetrabutoxytitanium, tetrabutoxyzirconium or dibutyltin diacetate) as a hydrolytic catalyst. Alternatively, an aqueous solution having metal oxide microparticulates dispersed therein may be added.

Hydrolysis may be conducted by adding water to a silane compound or a mixture of silane compounds as stated above at a temperature of about 0 to 80° C., and keeping the solution at a temperature of about 0 to 80° C. for about 10 minutes to 5 days for reaction to take place, more preferably at about 20 to 50° C. for about 1 to 24 hours. Too low a temperature may slow down the progress of reaction, resulting in low productivity, whereas too high a temperature may make reaction control difficult and often cause gelation.

Component (2) is a vinyl polymer having UV absorbing groups and hydrophilic groups which is dissolvable or dispersible in a water-containing hydrophilic solvent. The preferred vinyl polymer is obtained by copolymerizing the following monomers (a) to (c):

(a) 5 to 80% by weight of a UV absorbing group-bearing vinyl polymerizable monomer, (b) 10 to 80% by weight of a hydrophilic group-bearing vinyl polymerizable monomer, and (c) 0 to 85% by weight of another vinyl polymerizable monomer devoid of Si—X groups wherein X is as defined above, provided that the total of monomers (a) to (c) is 100% by weight.

The UV absorbing group-bearing vinyl polymerizable monomers (a) include, for example, vinyl monomers having UV absorbing groups derived from benzotriazole, benzophenone or triazine compounds. Of these, benzotriazole and benzophenone based monomers are preferred.

Suitable benzotriazole based monomers include 2-(2'-hydroxy-5'-(meth)acryloyloxyethylphenyl)-2H-benzotriazole, 2-(2'-hydroxy-5'-(meth)acryloyloxyethylphenyl)-5-chloro-2H-benzotriazole, 2-(2'-hydroxy-5'-(meth)acryloyloxypropylphenyl)-2H-benzotriazole, 2-(2'-hydroxy-5'-(meth)acryloyloxypropylphenyl)-5-chloro-2H-benzotriazole, 2-(2'-hydroxy-3'-tert-butyl-5'-(meth)acryloyloxyethylphenyl)-2H-benzotriazole, and 2-(2'-hydroxy-3'-tert-butyl-5'-(meth)acryloyloxyethylphenyl)-5-chloro-2H-benzotriazole.

Suitable benzophenone based monomers include 2-hydroxy-4-[2-(meth)acryloyloxy]ethoxybenzophenone, 2-hydroxy-4-[2-(meth)acryloyloxy]butoxybenzophenone, 2,2'-dihydroxy-4-[2-(meth)acryloyloxy]ethoxybenzophenone, and 2-hydroxy-4-[2-(meth)acryloyloxy]ethoxy-4'-[2-hydroxyethoxy]benzophenone.

Suitable triazine based monomers include 2,4-diphenyl-6-[2-hydroxy-4-(2-acryloyloxyethoxy)]-S-triazine, 2,4-bis(2-methylphenyl)-6-[2-hydroxy-4-(2-acryloyloxyethoxy)]-S-triazine, and 2,4-bis(2-methoxyphenyl)-6-[2-hydroxy-4-(2-acryloyloxyethoxy)]-S-triazine.

These UV absorbing group-bearing vinyl polymerizable monomers may be used alone or in admixture of any. The UV absorbing group-bearing vinyl polymerizable monomer (a) preferably constitutes 5 to 80% by weight, more preferably 10 to 70% by weight of the entire monomers. Less than 5% by weight of monomer (a) may fail to provide sufficient weather resistance whereas more than 80% by weight of monomer (a) may make the polymer less dispersible and fail to provide a satisfactory coating hardness.

The hydrophilic group-bearing vinyl polymerizable monomers (b) include OH group-bearing monomers such as 2-hydroxyethyl (meth)acrylate; COOH group-bearing monomers such as (meth)acrylic acid; monomers having a polyethylene glycol chain such as ethoxydiethylene glycol (meth)acrylate, methoxytriethylene glycol (meth)acrylate, methoxypolyethylene glycol (meth)acrylate, polyethylene glycol (meth)acrylate, lauroxypolyethylene glycol (meth) acrylate, and alkylphenoxypolyethylene glycol (meth) acrylates; amide group-bearing monomers such as acrylamide and N,N-dimethylacrylamide; amino group-bearing monomers such as dimethylaminoethyl (meth)acrylate; epoxy group-bearing monomers such as glycidoxy (meth) acrylate; quaternary ammonium salt structure-bearing monomers such as acrylonitrile and 2-hydroxy-3-(meth) acryloxypropyltrimethylammonium chloride; sodium sulfonate structure-bearing monomers such as tetrahydrofurfuryl (meth)acrylate and sodium 2-sulfoethyl(meth)acrylate; and EO-modified phosphoric acid (meth)acrylate. For the stability of a system in which the monomer is blended, it is preferred to use the monomers having a polyethylene glycol chain.

The hydrophilic group-bearing vinyl polymerizable monomer (b) preferably constitutes 10 to 80% by weight, more preferably 30 to 70% by weight of the entire monomers. Less than 10% by weight of monomer (b) may make the polymer less dispersible in a water-containing system and fail to provide satisfactory flexibility. With more than 80% by weight of monomer (b), hydrophilic nature may become predominant so that a coating becomes water-absorptive, losing adhesion and weather resistance.

The other vinyl polymerizable monomer devoid of Si—X groups (c) may be any of a variety of prior art well-known vinyl monomers as long as they do not contain a hydrolyzable silicon atom. Examples of other vinyl monomers include, but are not limited to, methyl (meth)acrylate, butyl (meth)acrylate, 2-ethylhexyl (meth)acrylate, cyclopentyl (meth)acrylate, cyclohexyl (meth)acrylate, phenyl (meth) acrylate, cyclohexylmethyl (meth)acrylate, dicyclopentanyl (meth)acrylate, isobornyl (meth)acrylate, styrene, as well as monomers having a cyclic hindered amine structure such as 2,2,6,6-tetramethyl-4-piperidinyl methacrylate and 1,2,2,6, 6-pentamethyl-4-piperidinyl methacrylate. Use of polyfunctional acrylate compounds which can form a branched structure should be avoided in principle although use of minute amounts is acceptable.

The other vinyl polymerizable monomer devoid of Si—X groups (c) is preferably used in an amount of 0 to 85% by weight, more preferably 0 to 50% by weight based on the total weight of the monomers.

Polymers of these vinyl polymerizable monomers can be prepared simply by dissolving the vinyl monomers in an organic solvent, adding to the solution a radical polymerization initiator selected from among peroxides (e.g., dicumyl peroxide and benzoyl peroxide) and azo compounds (e.g., azobisisobutyronitrile), and heating the solution for reaction to take place. Polymers may also be prepared by an emulsion polymerization process of emulsifying the vinyl polymerizable monomers, followed by polymerization. Suitable radical polymerization initiators used in the emulsion polymerization process include persulfates such as potassium persulfate and ammonium persulfate; water-soluble type initiators such as aqueous hydrogen peroxide, t-butyl hydroperoxide, t-butyl peroxymaleate, succinic acid peroxide, and 2,2'-azobis-[2-N-benzylamidino] propane hydrochloride; oil-soluble type initiators such as benzoyl peroxide, cumene hydroperoxide, dibutyl peroxide, diisopropylperoxydicarbonate, cumylperoxy neodecanoate, cumylperoxy octoate, and azoisobutyronitrile; and redox initiators combined with reducing agents such as acidic sodium sulfite, Rongalit and ascorbic acid. The polymer resulting from emulsion polymerization may be used in the emulsion form, or once taken out of the aqueous system and dissolved in an organic solvent again before use. It is preferable to use a polymer product resulting from solution polymerization which avoids inclusion of any unnecessary ingredient.

Among the polymers polymerized as above, those polymers having a weight average molecular weight (Mw) in the range of about 2,000 to 200,000 are preferred. A polymer with a Mw of less than 1,000 may be ineffective for imparting flexibility whereas a polymer with a Mw of more than 200,000 may form a solution which has too high a viscosity and is difficult to handle. Polymers with Mw of 3,000 to 100,000 are preferred.

The polymer (2) should be dissolvable or dispersible in a hydrophilic organic solvent as component (3). Since the coating composition of the invention can substantially contain water, the polymer (2) should preferably be dissolvable or dispersible in a hydrophilic organic solvent even when the solvent contains an amount of, especially at least 5% by weight of water. As used herein, the term "dispersible" means that the polymer does not precipitate out or separate from the solution, and remains dispersed in the solution in the suspended state.

The polymer (2) is added in an amount of 0.1 to 50 parts by weight per 100 parts by weight of the partial condensate (1) resulting from hydrolysis and partial condensation of the silane compound (A). Outside the range, less amounts of polymer (2) fail to provide sufficient flexibility whereas too large amounts result in a cured coat having a low hardness and hence, poor mar resistance.

Component (3) is a hydrophilic organic solvent. When the hydrophilic organic solvent is additionally used during the hydrolysis, it assists in dissolving or uniformly dispersing the polymer (2) in the coating composition of the invention. Examples of suitable hydrophilic organic solvents include alcohols such as methanol, ethanol, isopropyl alcohol, butanol, t-butanol, iso-butanol, ethylene glycol, ethylene glycol monopropyl ether, propylene glycol, propylene glycol monomethyl ether, propylene glycol monopropyl ether, and diacetone alcohol; ketones such as acetone, methyl ethyl ketone, methyl isobutyl ketone (MIBK), acetylacetone and ethyl acetoacetate; amides such as dimethylformamide, dimethylacetamide, and N-methylpyrrolidone; esters such as ethyl acetate, butyl acetate, propylene glycol monomethyl ether acetate, and γ-butyrolactone; and ethers such as tetrahydrofuran, 1,4-dioxane, and ethylene glycol dimethyl ether. Included in the hydrophilic solvent are those solvents (primarily alcohols) formed as by-products during hydrolysis of the hydrolyzable silane compound (A).

The hydrophilic solvent (3) is used in an amount of 50 to 5,000 parts by weight per 100 parts by weight of the partial condensate (1) resulting from hydrolysis and partial condensation of the silane compound (A). With less than 50 parts of the hydrophilic solvent, the concentration of the partial condensate (1) becomes too high to provide storage stability. With more than 5,000 parts, it is difficult to build up a coat having a sufficient thickness, and a cured coat has poor mar resistance. The preferred amount of the hydrophilic solvent is 100 to 3,000 parts by weight per 100 parts by weight of the partial condensate (1).

In the hard protective coat-forming coating composition of the invention, (4) a microparticulate metal oxide having a primary particle size of 1 to 100 nm is preferably included for the purposes of enhancing the hardness and mar resistance of the cured coat and/or imparting conductivity or UV shielding function. Preferred microparticulate metal oxides are microparticulates of inorganic oxides including silica, aluminum oxide, titanium oxide, zinc oxide, zirconium oxide, cerium oxide, tin oxide, indium oxide and compound oxides thereof. Also included are hydrolyzates of alkoxides and chelates of metals such as Ti, Zr and Ce. Of these, preferred are silica ($SiO_2$) for the purpose of enhancing hardness, titanium oxide or compound oxides containing titanium atom for the purpose of UV shielding, and tin oxide or compound oxides containing tin atom for the purpose of imparting conductivity. The microparticulates should have a primary particle size of 1 to 100 nm in order to ensure transparency to the cured coat. Some particles with a size of less than 1 nm are unstable whereas particles with a size of more than 100 nm may render the cured coat white turbid. The preferred primary particle size is 5 to 50 nm. Prior to use, the microparticulate metal oxide may be surface treated with organometallic compounds such as silane, titanium, aluminum or zirconium based coupling agents.

If used, the microparticulate metal oxide is preferably added in amounts of 1 to 300 parts by weight, more preferably 10 to 150 parts by weight, calculated as solids, per 100 parts by weight of the partial condensate (1) resulting from hydrolysis and partial condensation of the silane compound (A). More than 300 parts by weight of the microparticulate metal oxide may detract from the transparency of the cured coat whereas less than 1 part may fail to provide a sufficient hardness or any desired function.

The microparticulate metal oxide is often used in a state dispersed in a dispersing medium, i.e., metal oxide sol. The dispersing medium used herein may be water or an organic solvent. When water is used as the dispersing medium for the microparticulate metal oxide, the dispersing medium is preferably adjusted to pH 2 to 10, especially pH 3 to 7. Examples of the organic solvent useful as the dispersing medium include alcohols such as methanol, ethanol, isopropyl alcohol, butanol, t-butanol, isobutanol, ethylene glycol, ethylene glycol monopropyl ether, propylene glycol, propylene glycol monomethyl ether, and propylene glycol monopropyl ether; ketones such as methyl ethyl ketone and methyl isobutyl ketone; amides such as dimethylformamide, dimethylacetamide and N-methylpyrrolidone; esters such as ethyl acetate, butyl acetate, propylene glycol monomethyl ether acetate, and γ-butyrolactone; and ethers such as tetrahydrofuran, 1,4-dioxane, and ethylene glycol dimethyl ether. Of these, alcohols and ketones are preferred in which water is readily dispersible. These organic solvents may be used alone or in admixture of two or more as the dispersing medium.

In the hard protective coat-forming coating composition of the invention, a curing catalyst is preferably included for promoting condensation of silanol (Si—OH) groups resulting from hydrolysis for thereby increasing the crosslinking density to increase the hardness of the coat. Illustrative examples of the curing catalyst include acid based catalysts such as formic acid, acetic acid, citric acid, maleic acid, hydrochloric acid, sulfuric acid, phosphoric acid, and methanesulfonic acid; alkali based catalysts such as sodium hydroxide, potassium hydroxide, sodium methylate, potassium methylate, dimethylamine, triethylamine, DBU, acetic ethanol amine, formic dimethylaniline, benzoic acid, tetraethylammonium salts, sodium acetate, sodium propionate, sodium formate, benzyltrimethylammonium acetate; organometallic catalysts such as tetraisopropoxytitanium, tetra-n-butoxytitanium, dibutoxy-(bis-2,4-pentanedionate) titanium, tetrabutoxyzirconium, diisopropoxy(bis-2,4-pentanedionate)-titanium, tetraisopropoxyzirconium, dibutoxy-(bis-2,4-pentanedionate)zirconium, diisopropoxy (bis-2,4-pentanedionate)zirconium, aluminum triisobutoxide, aluminum triisopropoxide, aluminum acetylacetonate, aluminum perchlorate, aluminum chloride, cobalt octylate, cobalt acetylacetonate, zinc octylate, zinc acetylacetonate, iron acetylacetonate, tin acetylacetonate, dibutyltin octylate and dibutyltin laurate; and aminosilanes such as aminopropyltriethoxysilane and 2-aminoethylaminopropyltrimethoxysilane. The catalyst is preferably added in amounts of 0.01 to 10% by weight, more preferably 0.02 to 2% by weight based on the weight of the partial condensate (1) resulting from hydrolysis and partial condensation of the silane compound (A).

In the hard protective coat-forming coating composition of the invention, there may be included optional components, for example, organic and inorganic UV absorbers, leveling agents, and buffer agents for controlling the pH of the system to pH 2 to 7 at which silanol groups can remain stable, e.g., acetic acid, sodium acetate, disodium hydrogen phosphate and citric acid.

When the hard protective coat-forming coating composition of the invention is applied and cured to the surface of a substrate, the cured coat generally has a thickness of 1 to 10 μm, preferably 1 to 8 μm. In applying the hard protective coat-forming coating composition of the invention to the substrate surface, various coating techniques including dipping, spin coating, flow coating, roll coating, spray coating and screen printing are employable. Of these, the dipping, spraying and roll coating techniques capable of easily controlling film thickness are preferably employed whereby a coat is formed to a predetermined thickness. Typical coating process includes applying the composition to a transparent plastic substrate and heating at a temperature from 60° C. to the softening point of the plastic substrate for thereby curing the coat.

The hard protective coat-forming coating composition of the invention can be applied to a variety of transparent plastic substrates. The plastics to which the composition is applicable may be any plastics having good optical properties, and include, but are not limited to, polycarbonate resins, polyalkylene terephthalate resins such as PET, cellulose resins such as diacetyl cellulose, acetate butyrate cellulose and triacetyl cellulose, acrylic resins, polyimide resins, polyester resins, polyether sulfone resins, liquid crystal resins such as polyarylates, polyurethane resins, polysulfone resins, polyether ketone resins, and polyolefin resins such as trimethylpentene. Of these, polycarbonate resins, polyalkylene terephthalate resins such as PET, and acrylic resins are preferred. Transparent substrates may take the form of molded parts, plates or films.

Where adhesion is insufficient, any of prior art well-known bond-improving or primer layers may be disposed between the transparent plastic substrate and the hard protective coat-forming layer. The bond-improving layer may be made of acrylic resins, urethane resins, and these resins having tackifiers such as aminosilanes added thereto. These resins may further contain inorganic or organic UV absorbers.

EXAMPLE

Examples of the invention are given below by way of illustration and not by way of limitation. All parts and percents are by weight. Average molecular weight is a number average molecular weight (Mn) as measured by gel permeation chromatography (GPC) using a polystyrene standard.

Synthesis of Polymers

Synthesis Example 1

A 1-liter flask equipped with a stirrer, condenser and thermometer was charged with 650 g of propylene glycol monomethyl ether and heated to 80° C. Under a nitrogen atmosphere and with heating and stirring, a mixture of 323 g (1.0 mol) of 2-(2'-hydroxy-5'-methacryloyloxyethylphenyl)-2H-benzotriazole, 323 g (0.67 mol) of methoxypolyethylene glycol acrylate (EO average degree of polymerization=9) and 15 g of azobisisobutyronitrile was added dropwise to the solvent over 30 minutes. Heating and stirring was continued at 100° C. for 5 hours, obtaining a solution of acrylic polymer A which had a Mn of 8,000, contained 50% of the UV absorbing vinyl polymerizable monomer and 50% of the hydrophilic vinyl polymerizable monomer, and did not contain hydrolyzable silyl groups.

The acrylic polymer A solution was added to a mixture of ethanol, isobutanol and water in a weight ratio of 40:40:20 (i.e., water-containing solution), to a concentration of 10% whereupon the polymer was uniformly dissolved.

Synthesis Example 2

A polymer was synthesized as in Synthesis Example 1, using 550 g of a 2:1 solvent mixture of diacetone alcohol and methyl isobutyl ketone instead of 650 g of propylene glycol monomethyl ether, and using 162 g (0.5 mol) of 2-(2'-hydroxy-5'-methacryloyloxyethylphenyl)-2H-benzotriazole, 218 g (1.0 mol) of methoxypolyethylene glycol acrylate (EO average degree of polymerization=3), 114 g (0.8 mol) of glycidyl methacrylate, 30 g (0.3 mol) of methyl methacrylate and 20 g (0.1 mol) of 2,2,6,6-tetramethyl-4-piperidinyl methacrylate as the vinyl polymerizable monomers. There was obtained a solution of acrylic polymer B which had a Mn of 9,100, contained 30% of the UV absorbing vinyl polymerizable monomer and 70% of the hydrophilic vinyl polymerizable monomer, and did not contain hydrolyzable silyl groups.

As in Synthesis Example 1, the acrylic polymer B solution was added to the water-containing solution in a concentration of 10% whereupon the polymer was uniformly dissolved.

Synthesis Example 3

A polymer was synthesized as in Synthesis Example 1, using 533 g of propylene glycol monomethyl ether, and using 326 g (1.0 mol) of 2-hydroxy-4-[2-methacryloyloxy]ethoxybenzophenone, 96 g (0.2 mol) of methoxypolyethylene glycol acrylate (EO average degree of polymerization=9), and 111 g (0.5 mol) of 2-hydroxy-3-methacryloxypropyl trimethylammonium chloride as the vinyl polymerizable monomers. There was obtained a solution of acrylic polymer C which had a Mn of 11,300, contained 61% of the UV absorbing vinyl polymerizable monomer and 39% of the hydrophilic vinyl polymerizable monomer, and did not contain hydrolyzable silyl groups.

As in Synthesis Example 1, the acrylic polymer C solution was added to the water-containing solution in a concentration of 10% whereupon the polymer was uniformly dissolved.

Synthesis Example 4

A polymer was synthesized as in Synthesis Example 1, using 560 g of propylene glycol monomethyl ether, and using 218 g (1.0 mol) of methoxypolyethylene glycol acrylate (EO average degree of polymerization=3), 200 g (2.0 mol) of methyl methacrylate and 142 g (1.0 mol) of butyl acrylate as the vinyl polymerizable monomers. There was obtained a solution of acrylic polymer D which had a Mn of 34,500, did not contain UV absorbing vinyl polymerizable monomer, contained 39% of the hydrophilic vinyl polymerizable monomer, and did not contain hydrolyzable silyl groups.

As in Synthesis Example 1, the acrylic polymer D solution was added to the water-containing solution in a concentration of 10% whereupon the polymer was uniformly dissolved.

Synthesis Example 5

A polymer was synthesized as in Synthesis Example 1, using 550 g of propylene glycol monomethyl ether, and using 323 g (1.0 mol) of 2-(2'-hydroxy-5'-methacryloyloxyethylphenyl)-2H-benzotriazole, 22 g (0.1 mol) of methoxypolyethylene glycol acrylate (EO average degree of polymerization=3), and 200 g (2.0 mol) of methyl methacrylate as the vinyl polymerizable monomers. There was obtained a solution of acrylic polymer E which had a Mn of 3,700, contained 59% of the UV absorbing vinyl polymerizable monomer and 4% of the hydrophilic vinyl polymerizable monomer, and did not contain hydrolyzable silyl groups.

As in Synthesis Example 1, the acrylic polymer E solution was added to the water-containing solution in a concentration of 10%, but the polymer was not dissolved.

Synthesis Example 6

A polymer was synthesized as in Synthesis Example 1, using 530 g of propylene glycol monomethyl ether, and using 162 g (0.5 mol) of 2-(2'-hydroxy-5'-methacryloyloxyethylphenyl)-2H-benzotriazole, 218 g (1.0 mol) of methoxypolyethylene glycol acrylate (EO average degree of polymerization=3), 100 g (1.0 mol) of methyl methacrylate, and 49.6 g (0.20 mol) of γ-methacryloxypropyltrimethoxysilane as the vinyl polymerizable monomers. There was obtained a solution of acrylic polymer F which had a Mn of 14,600, contained 31% of the UV absorbing vinyl polymerizable monomer and 41% of the hydrophilic vinyl polymerizable monomer, and contained 9.4% of hydrolyzable silyl groups.

As in Synthesis Example 1, the acrylic polymer F solution was added to the water-containing solution in a concentration of 10% whereupon the polymer was uniformly dissolved.

Preparation of Primer Solution

As in Synthesis Example 1, a mixture of 24.8 g (0.20 mol) of γ-methacryloxypropyltrimethoxysilane, 175 g (1.75 mol) of methyl methacrylate, 16.2 g (0.05 mol) of 2-(2'-hydroxy-5'-methacryloxyethylphenyl)-2H-benzotriazole, and 2 g of azobisisobutyronitrile was added dropwise to 370 g of a 1:3 solvent mixture of MIBK and propylene glycol monomethyl ether, obtaining a solution of acrylic polymer having a Mn of 83,000.

To 100 g of the solution was added 10 g of a MIBK solution containing 20% of the reaction product obtained by effecting ring-opening reaction of 1.00 mol of γ-aminoethylaminopropyltrimethoxysilane with 2.00 mol of γ-glycidoxypropyldimethoxysilane in the co-presence of 3.00 mol of hexamethyldisilazane and further reacting with 2.00 mol of acetic anhydride. A primer solution was prepared in this way.

Preparation of Coating Compositions

Coating Composition I

A 1-liter flask equipped with a stirrer, condenser and thermometer was charged with 178 g (1.0 mol) of methyltriethoxysilane, 50 g of isobutanol and 50 g of propylene glycol monomethyl ether, which were stirred. Under ice cooling, 108 g (6.0 mol) of 0.1N aqueous acetic acid was added dropwise over one hour. Stirring was continued for 24 hours at room temperature to drive hydrolysis to completion. This solution had a nonvolatile content of 17.9% as measured under conditions of 105° C./3 hours. To this solution were added 50 g of a methanol-dispersed silica sol having a primary particle size of 20 nm and an effective component content of 30%, 75 g of a water-dispersed silica sol having a primary particle size of 15 nm and an effective component content of 20%, and 0.1 g of a polyether-modified silicone oil. Further, 20 g of the acrylic polymer A solution and 1 g of a 10% sodium acetate aqueous solution were added, obtaining a coating composition I. This coating solution was not turbid and had a volatile content of 80% as measured under conditions of 105° C./3 hours. In this system, the molar ratio ($H_2O/Si$—X) was 3.1.

Coating Composition II

As was coating composition I, a flask was charged with 142 g (0.8 mol) of methyltriethoxysilane, 42 g (0.2 mol) of tetraethoxysilane, 170 g of isobutanol and 60 g of propylene glycol monomethyl ether, which were stirred. Under ice cooling, 115 g (6.4 mol) of 0.1N aqueous acetic acid was added dropwise over one hour. Stirring was continued for 24 hours at room temperature to drive hydrolysis to completion. This solution had a nonvolatile content of 12.9% as measured under conditions of 105° C./3 hours. To this solution, 0.1 g of a polyether-modified silicone oil, 40 g of the acrylic polymer B solution and 1 g of a 10% sodium acetate aqueous solution were added, obtaining a coating composition II. This coating solution was not turbid and had a volatile content of 85% as measured under conditions of 105° C./3 hours. In this system, the molar ratio ($H_2O/Si$—X) was 2.0.

Coating Composition III

As was coating composition I, a flask was charged with 118 g (0.5 mol) of γ-glycidoxypropyltrimethoxysilane, 89 g (0.5 mol) of methyltriethoxysilane, 210 g of isobutanol and 100 g of propylene glycol monomethyl ether, which were stirred. Under ice cooling, 81 g (4.5 mol) of 0.1N aqueous acetic acid was added dropwise over one hour. Stirring was continued for 2 hours at room temperature, then for 8 hours at 40° C. to drive hydrolysis to completion. To this solution, 150 g of a methanol-dispersed compound oxide sol having a primary particle size of 20 nm, a weight compositional ratio $TiO_2/ZrO_2/SiO_2$=85/3/12, and an effective component content of 30%, 2 g of aluminum acetylacetonate, 0.1 g of a polyether-modified silicone oil, and 20 g of the acrylic polymer C solution were added, obtaining a coating composition III. This coating solution was not turbid, and had a volatile content of 75% as measured under conditions of 105° C./3 hours. In this system, the molar ratio ($H_2O/Si$—X) was 1.5.

Coating Compositions IV to VII

Coating compositions IV to VI were prepared as was coating composition I except that the acrylic polymer D to F solutions were used instead of the acrylic polymer A solution. Coating composition VII was prepared as was coating composition I except that the acrylic polymer solution was not added.

The coating solutions I to VII were applied and cured by the method described below and reported in Table 1, which are designated Examples 1–6 and Comparative Examples 1–8. The cured coats were evaluated for mar resistance, adhesion and weather resistance. The results are shown in Table 1.

Application and Curing

Using a dipping technique, the coating solution was applied to polycarbonate (PC) resin plates and acrylic resin plates dimensioned 10 cm×10 cm×3.0 mm (thick) whose surface had been cleaned, to such a thickness that the cured coat might become 3 to 5 μm thick. After the solvent was volatilized off by air drying, the coating was cured by holding in a hot air circulation oven at 80 to 120° C. for 5 to 30 minutes. In the event where the plate was treated with a primer, the coating solution was similarly applied and cured to form a cured coat of 3 to 5 μm thick.

Measurement and Evaluation of Physical Properties (1) Mar resistance

Using a Taber abrader equipped with an abrasive wheel CS-10F, a sample was rotated under a load of 500 g according to ASTM 1044. After 500 revolutions, the sample was measured for haze. A Taber abrasion (%) was calculated as ΔHz=the haze after test minus the haze prior to test.

(2) Adhesion of cured film

A cross-hatch adhesive tape test was carried out according to JIS K-5400 by scribing a sample with a razor along eleven spaced 1-mm apart orthogonal lines to define 100 square sections in the coating, closely applying a commercially available adhesive tape thereto, and quickly peeling the adhesive tape by an angle of 90 degrees. The number (X) of remaining (not peeled) coating sections is expressed as X/100.

(3) Appearance

The coat was rated Good "○" when it was uniformly transparent over the entire surface and Poor "×" when some non-transparent areas or micro-cracks were found.

(4) Weathering test

A weathering test was carried out for 500 hours by a Metaling weather meter (Suga Test Instruments Co., Ltd.). The coat was rated Good "○" when no cracks were found on the surface, fair "Δ" when micro-cracks were found, and poor "×" when cracks were found.

TABLE 1

| | Substrate | Primer | Coating composition | Appearance | Mar resistance ΔHz | Adhesion (/100) | Weather resistance (cracks) |
|---|---|---|---|---|---|---|---|
| Example 1 | acrylic | — | I | ○ | 2.9 | 100 | ○ |
| Example 2 | acrylic | — | II | ○ | 3.6 | 100 | ○ |
| Example 3 | acrylic | — | III | ○ | 4.7 | 100 | ○ |
| Example 4 | PC | used | I | ○ | 3.3 | 100 | ○ |

TABLE 1-continued

| | Substrate | Primer | Coating composition | Appearance | Mar resistance ΔHz | Adhesion (/100) | Weather resistance (cracks) |
|---|---|---|---|---|---|---|---|
| Example 5 | PC | used | II | ○ | 3.8 | 100 | ○ |
| Example 6 | PC | used | III | ○ | 5.2 | 100 | ○ |
| Comparative Example 1 | acrylic | — | IV | ○ | 2.5 | 100 | × |
| Comparative Example 2 | acrylic | — | V | × | 8.5 | 20 | Δ |
| Comparative Example 3 | acrylic | — | VI | × | 3.0 | 100 | × |
| Comparative Example 4 | acrylic | — | VII | ○ | 2.7 | 100 | × |
| Comparative Example 5 | PC | used | IV | ○ | 2.8 | 100 | × |
| Comparative Example 6 | PC | used | V | × | 9.0 | 50 | Δ |
| Comparative Example 7 | PC | used | VI | × | 3.4 | 100 | × |
| Comparative Example 8 | PC | used | VII | ○ | 2.9 | 100 | × |

The hard protective coat-forming coating composition of the invention contains a polymer having UV absorbing groups, dispersible in a water-containing solvent system, and free of hydrolyzable silicon atoms. Since the polymer is not fixed within the coat by crosslinking, the hard coat is endowed with flexibility. Even though cure proceeds with the progress of time, the coat is prevented from cracking. As a result, the coat has a high hardness and excellent mar resistance, and at the same time, has a sufficient flexibility to prevent crack generation. The hard protective coat is maintained over a prolonged period of time. Since UV absorbing groups can be introduced and fixed within the hard protective coat, the coat can prevent the underlying substrate from degradation and maintain good weather resistance and adhesion. By applying and curing the hard protective coat-forming coating composition of the invention to a transparent plastic substrate, the plastic surface is tailored to a hard surface having improved mar resistance. Therefore, the coating composition of the invention finds use as glazing for buildings, automobiles and trains, highway acoustic barrier walls, display covers, instrument covers, and optical articles requiring durable weathering resistance such as transparent plastic lenses.

Japanese Patent Application No. 2002-006021 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A coating composition for forming a hard protective coat having improved weather resistance, comprising
   (1) 100 parts by weight of a partial condensate obtained by subjecting a silane compound of the formula: $R_mSiX_{4-m}$ wherein R is a substituted or unsubstituted monovalent hydrocarbon group of 1 to 10 carbon atoms, X is a hydrolyzable group of 1 to 6 carbon atoms, and m is 0, 1 or 2, and/or a partial hydrolytic condensate thereof, to hydrolysis and partial condensation with a sufficient amount of water to meet a molar ratio: $1.2 \leq H_2O/Si\text{—}X \leq 10$,
   (2) 0.1 to 50 parts by weight of a vinyl polymer having UV absorbing groups and hydrophilic groups which is dissolvable or dispersible in a water-containing hydrophilic solvent, and
   (3) 50 to 5,000 parts by weight of a hydrophilic organic solvent.

2. The coating composition of claim 1 wherein the vinyl polymer (2) is obtained by copolymerizing the following monomers (a) to (c):
   (a) 5 to 80% by weight of a UV absorbing group-bearing vinyl polymerizable monomer,
   (b) 10 to 80% by weight of a hydrophilic group-bearing vinyl polymerizable monomer, and
   (c) 0 to 85% by weight of another vinyl polymerizable monomer devoid of Si-X groups wherein X is as defined above.

3. The coating composition of claim 1, further comprising (4) 1 to 300 parts by weight of a microparticulate metal oxide having a primary particle size of 1 to 100 nm.

4. The coating composition of claim 3 wherein the microparticulate metal oxide is $SiO_2$.

5. The coating composition of claim 3 wherein the microparticulate metal oxide contains at least titanium atom.

6. The coating composition of claim 1, further comprising (5) a curing catalyst.

7. The coating composition of claim 2 wherein in the UV absorbing group-bearing vinyl polymerizable monomer (a), the UV absorbing group has a benzotriazole structure.

8. The coating composition of claim 2 wherein in the UV absorbing group-bearing vinyl polymerizable monomer (a), the UV absorbing group has a benzophenone structure.

9. The coating composition of claim 2 wherein in the hydrophilic group-bearing vinyl polymerizable monomer (b), the hydrophilic group has a polyoxyethylene structure.

10. An optical article comprising a transparent plastic substrate and a hard protective coat formed thereon by applying and curing the coating composition of claim 1, the hard protective coat having weather resistance.

11. An optical article comprising a transparent plastic substrate having a bond-improving layer on its surface and a hard protective coat formed thereon by applying and curing the coating composition of claim 1, the hard protective coat having weather resistance.

12. The coating composition of claim 1 wherein R is a methyl group.

13. The coating composition of claim 3 wherein the microparticulate metal oxide is a compound oxide.

14. The coating composition of claim 2 wherein the hydrophilic group-bearing vinyl polymerizable monomer is at least one selected from the group consisting of OH group-bearing monomers, monomers having a polyethylene glycol chain, amide group-bearing monomers, epoxy group-bearing monomers, quaternary ammonium salt structure-bearing monomers, and sodium sulfonate structure-bearing monomers.

15. The coating composition of claim 2 wherein the hydrophilic group-bearing vinyl polymerizable monomer is a monomer having a polyethylene glycol chain.

16. The coating composition of claim 14, wherein said OH group-bearing monomers is 2-hydroxyethyl(meth) acrylate.

17. The coating composition of claim 14, wherein said monomers having a polyethylene glycol chain are at least one selected from the group consisting of ethoxydiethylene glycol (meth)acrylate, methoxytriethylene glycol (meth) acrylate, methoxypolyethylene glycol (meth)acrylate, polyethylene glycol (meth)acrylate, lauroxypolyethylene glycol (meth)acrylate, and alkylphenoxy olyethylene glycol (meth) acrylate.

18. The coating composition of claim 14, wherein said amide group-bearing monomers are at least one selected from the group consisting of acrylamide and N,N-dimethylacrylamide.

19. The coating composition of claim 14, wherein said quaternary ammonium salt structure-bearing monomers are at least one selected from the group consisting of acrylonitrile and 2-hydroxy-3-(meth) acryloxypropyltrimethylammonium chloride.

20. The coating composition of claim 14, wherein said sodium sulfonate structure-bearing monomers are at least one selected from the group consisting of tetrahydrofurfuryl.

* * * * *